United States Patent [19]

Presti

[11] Patent Number: 5,007,978
[45] Date of Patent: Apr. 16, 1991

[54] APPARATUS FOR TIRE RETREADING

[75] Inventor: Frederick J. Presti, Warrington, Pa.

[73] Assignee: Presti Rubber Products, Inc., New Britain, Pa.

[21] Appl. No.: 336,758

[22] Filed: Apr. 12, 1989

[51] Int. Cl.$^5$ .......................... B60C 5/00; B29C 35/02
[52] U.S. Cl. .................... 156/394.1; 156/909
[58] Field of Search ........................ 156/96, 394.1, 909

[56] References Cited

U.S. PATENT DOCUMENTS

| | | | |
|---|---|---|---|
| 2,976,910 | 3/1961 | Nowak | 156/96 |
| 3,868,284 | 2/1975 | Hogan | 156/96 |
| 3,966,535 | 6/1976 | Abularach | 156/909 |
| 4,036,271 | 7/1977 | Presti | 156/96 |
| 4,046,947 | 9/1977 | Brodie | 156/96 |
| 4,328,053 | 5/1982 | Medlin | 156/96 |
| 4,571,277 | 2/1986 | Goldstein | 156/909 |
| 4,792,379 | 12/1988 | Magee et al. | 156/909 |
| 4,869,759 | 9/1989 | King et al. | 156/909 |

FOREIGN PATENT DOCUMENTS 0092699  11/1959  Netherlands .......................... 156/96

OTHER PUBLICATIONS

Brochure entitled "New! Vakuum Vulk Vapor Retreading System" (author and date unknown).
Brochure "If you want bottom line results, then you want Vakuum Vulk" (author and date unknown).
Brochure entitled "One goes further. Vakuum Vulk" (author and date unknown).

*Primary Examiner*—Peter Kratz
*Attorney, Agent, or Firm*—Howson and Howson

[57] ABSTRACT

Outer and inner elastomeric envelopes are compression-molded to contiguously encase the interior and exterior surfaces of a tire to prevent any air or steam present during a retreading process from penetrating the cushion gum between the retread and tire casing. The outer envelope of outwardly opening U-shape radial cross-section covers the tire periphery and a portion of the outer walls. The inner envelope includes a member of inwardly opening U-shape radial cross-section which covers the inside wall of the casing; and a pair of flanges outwardly opening U-shape radial cross-section, secured to opposite sides of the member, which cover the tire beads and a portion of the outer walls of the tire and underlap the outer envelope.

17 Claims, 3 Drawing Sheets

APPARATUS FOR TIRE RETREADING

BACKGROUND OF THE INVENTION

The present invention relates generally to tire retreading, and more particularly to improved methods and apparatus for curing envelopes for use in tire retreading.

In retreading a tire, the used casing is usually prepared by buffing off the worn tread to a profile at the periphery suitable for mounting a new tread. A precured and buffed tread is then adhered about the periphery of the casing with a lamina of uncured cushion gum cemented between the tread and casing. A resilient outer curing envelope of molded synthetic rubber, such as manufactured by Presti Rubber Products of New Britain, Pennsylvania, the assignee of the present application, is placed around the periphery of the assembly and suitably sealed around the opposite outer walls of the casing or near the tire bead, and a vacuum is drawn through a valve in the envelope for stretching the envelope into intimate contact with all surfaces of the tread. The curing envelope thus assures during the curing process that no air or steam penetrates into the cushion gum, and that pressure is uniformly applied over the entire bonding area without tread distortion. The tire is then placed in the autoclave for several hours at an elevated temperature and pressure to cure the gum and positively bond the casing and tread together. The envelope is then removed for re-use.

Various techniques for sealing the envelope around the tire have been employed which require special mountings, rims and curing innertubes. However, in addition to increasing labor and equipment costs, such techniques often diminish the efficiency and uniformity of heat transfer for curing the cushion gum. Furthermore, if the tire casing has a small crack or hole, air may seep through and cause separation at the tread and casing interface. Even if a repair were applied at the hole, the environment of the autoclave may cause the repair to fail during the curing process if the repair is left unprotected.

An alternative arrangement for sealing the outer envelope uses a synthetic rubber inner envelope in combination with the outer envelope. One such inner envelope has been fabricated from four annular sections of calendered sheet seamed together to approximate the general cross sectional profile of the casing for covering the entire inside wall, bead, and annular inner portions of the opposite outer walls. An annular boss is cemented along the outer perimeter on which the outer envelope overlaps to form annular seals. Thus, when a vacuum is drawn, the space at the interface of the tire and the outer and inner envelopes is completely evacuated.

While such inner envelopes may function satisfactorily for some purposes, breaks in the many seams and cemented surfaces with frequent re-use prevent drawing the vacuum required between the tire and envelope interfaces. In addition, the relatively high pliability of the calendered sheet envelopes precludes simultaneously vulcanizing rubber on restored bead surfaces of the tire while retreading because the envelopes cannot retain the cross sectional profile of the bead during the curing process. Furthermore, there is a demand for form-fit durable inner curing envelope which can be readily installed on a tire in combination with an outer curing envelope, and re-used over a relatively long period of time before wearing out.

SUMMARY OF THE INVENTION

Accordingly, it is an object of the present invention to provide a novel and improved inner curing envelope for use with an outer curing envelope in a tire retreading process.

Another object of the invention is to provide a durable, form-fit curing envelope suitable for use in tire retreading and bead reconstruction.

A further object of the invention is to provide an improved inner curing envelope for reliably sealing a tire from air and steam present during a retreading process.

A still further object of the invention is to provide durable inner envelopes which can be readily manufactured and installed on a tire.

Yet another object of the invention is to provide a novel and improved process for making an inner curing envelope used in retreading tires and reconstructing tire beads.

Briefly, these and other objects and aspects of the invention are accomplished by an inner curing envelope of synthetic rubber formed to cover the interior wall of a tire, to form-fit around the opposite beads of the tire, and to underlap an outer curing envelope for providing therewith a completely sealed enclosure. The inner envelope includes a compression-molded annular web of generally U-shaped radial cross-section opening inwardly and having an extended width substantially corresponding to the extended width of the interior wall of the tire. A pair of compression-molded annular flanges of generally U-shaped radial cross-section opening outwardly are each seamed along one outer edge thereof to the opposite inner edges of the web with the base portion extending radially outward. The other outer edges of the flanges are formed into beads of wedge-shaped radial cross-section. In one embodiment, the inner envelope is sized to radially locate the beads on the outer walls of the tire at their widest dimension to form a seal with the underlapping edges of the outer curing envelope. In another embodiment, the inner envelope is sized to radially locate the beads adjacent to the tire beads and form a seal with the underlapping edges of the outer envelope at the inner surface of the tire bead.

BRIEF DESCRIPTION OF THE DRAWINGS

Other objects, advantages and novel features of the invention will become more apparent from the following detailed description of the invention when considered in conjunction with the accompanying drawings wherein.

DESCRIPTION OF THE PREFERRED EMBODIMENT

Figure 1:
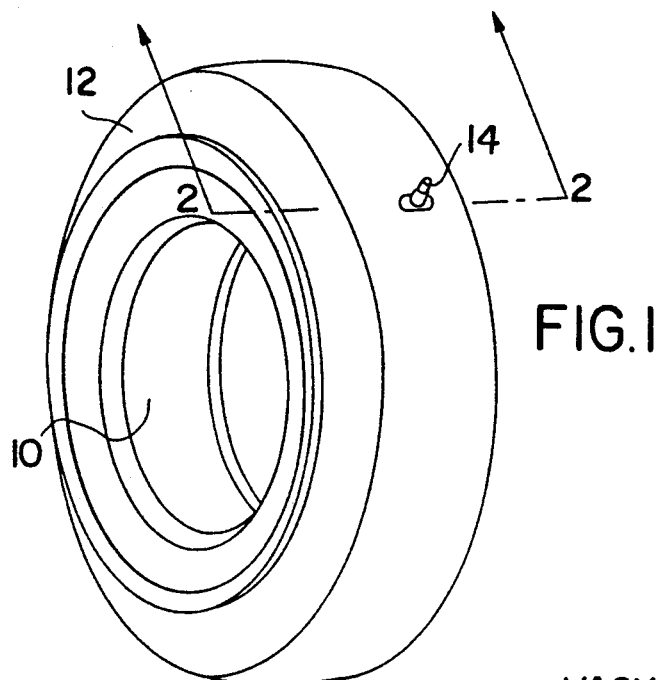
FIG. 1 is a perspective view of one embodiment of an inner curing envelope according to the invention installed with an outer curing envelope on a tire.

Referring now to the drawings wherein like characters designate like or corresponding parts throughout the several views, FIG. 1 shows an inner curing liner or envelope 10 installed with an outer curing envelope 12 on a tire which is totally enclosed therewithin. A valve 14 in outer envelope 12 provides a connection for drawing a vacuum in the space between the envelopes 10 and 12 and the tire.

Figure 2:
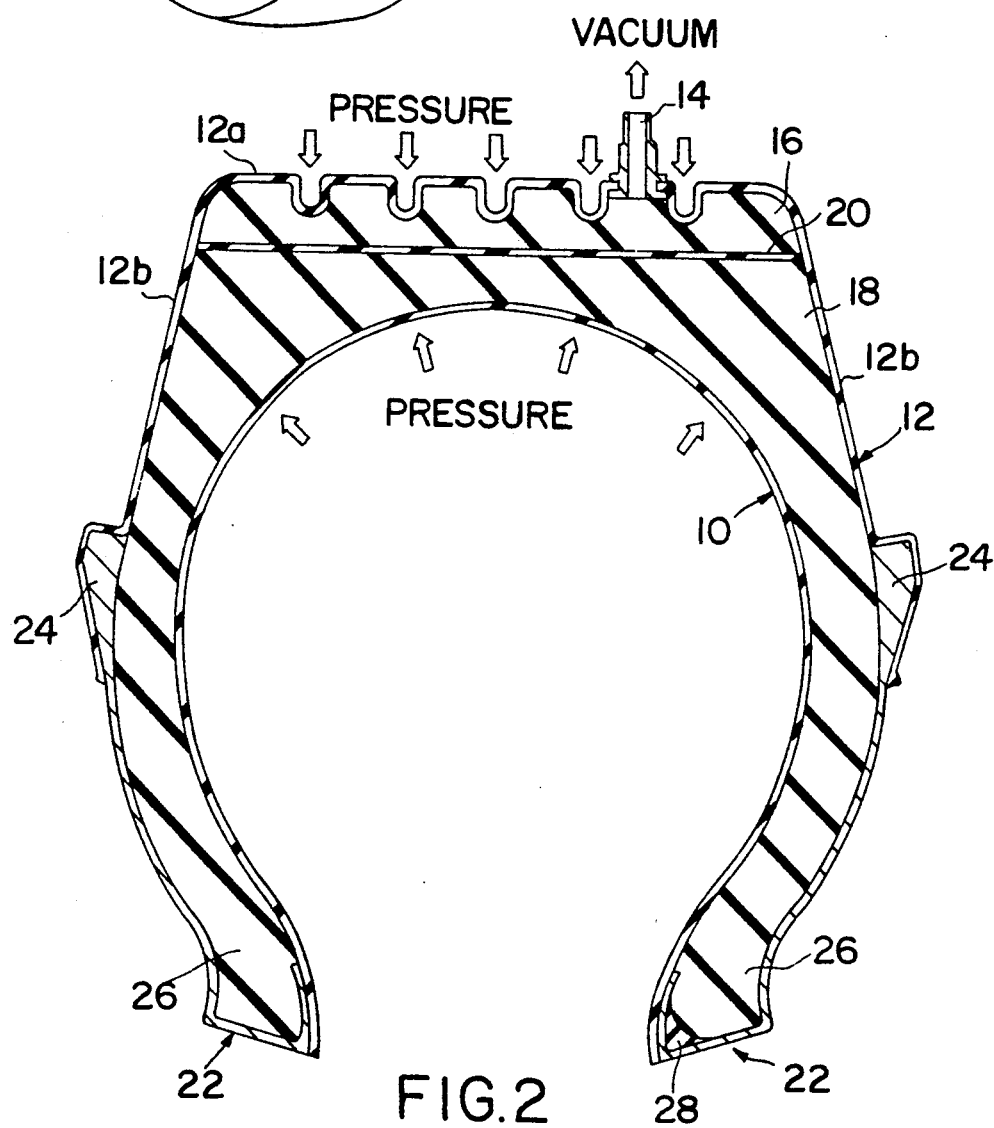
FIG. 2 is a radial cross-sectional view of the inner and outer curing envelopes and the tire, under external pressure, taken along the line 2—2 of FIG. 1.

FIG. 2 shows the envelopes and tire assembly after a vacuum has been drawn and the tire placed under pressure such as in a curing autoclave. The tire includes a pre-cured tread 16 adhered to the periphery of a casing 18 with a layer of uncured cushion gum 20 which is to be cured in the autoclave at an elevated temperature and pressure for a good bond of the tread 16 to casing 18.

Figure 3:
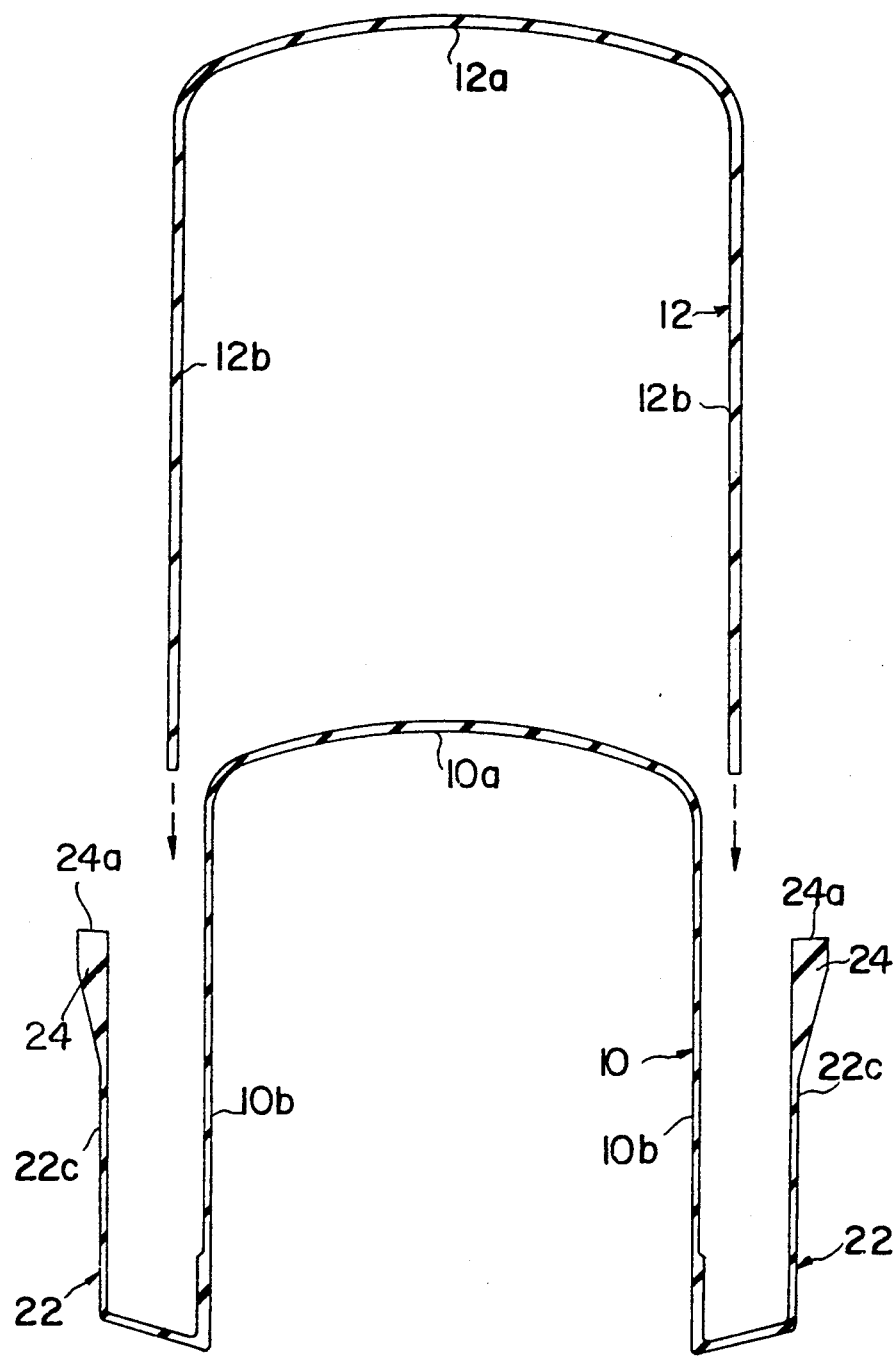
FIG. 3 is a radial cross-sectional view of the inner and outer curing envelopes of FIG. 1 in a relaxed state.

In its relaxed state as shown in FIG. 3, envelope 12 is of synthetic rubber compression-molded into a generally U-shaped radial cross-section and includes an annular base 12a with inwardly extending sides or skirts 12b. It is preferable that skirts 12b be of thinner gage than base 12a for ease in stretching envelope 12 over the tire while minimizing tread distortion when pressure is applied to the tire.

Figure 4:
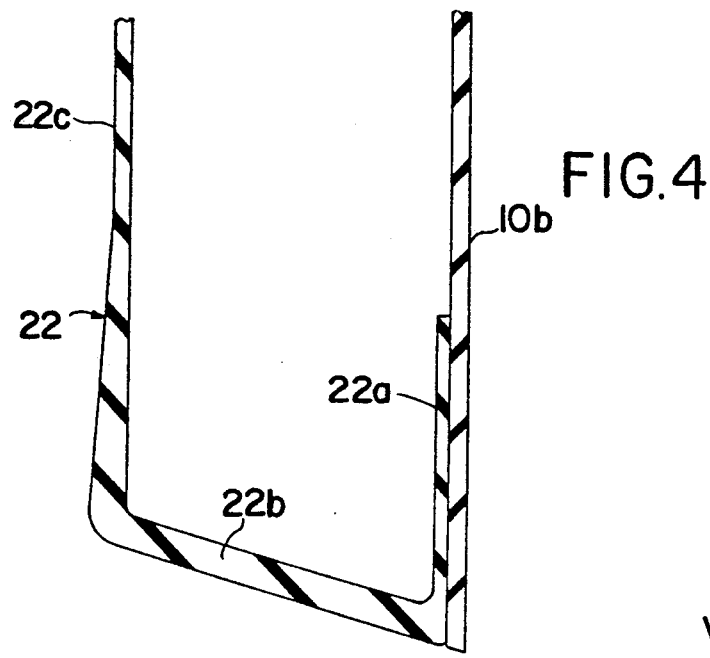
FIG. 4 is an enlarged radial cross-sectional view of a flange of the inner curing envelope of FIG. 3.

Inner envelope 10, in the relaxed state of FIG. 3, is also of synthetic rubber compression-molded into a general U-shaped radial cross-section and has an annular base 10a with inwardly extending skirts 10b like outer envelope 12. In addition, envelope 10 includes annular flanges 22 of synthetic rubber compression-molded into a generally U-shaped radial cross-section with sides 22a and 22c extending outwardly from a base 22b. As best seen in FIG. 4, side 22a of each flange 22 is seamed along respective radially inner edges of envelope skirts 10b with base 22b axially extending outward. The other side 22c terminates in a bead 24 of wedge-shape radial cross-section with a blunt face 24a normal to the length of side 22c. This provides a seal interface with outer envelope 12 and a tear-resistant edge. For maximum sealing at the underlap with outer envelope 12, side 22c is formed to dispose bead 24 radially on the outer walls of the tire at its maximum width. The thickness of flange 22, or the combined thickness of flange 22 and skirt 10b, adjacent to the tire bead is greater than the gage along skirt 10b and side 22c in order to provide in relief the original contour of a tire bead 26 (FIG. 2) when envelope 10 is drawn under vacuum toward a damaged surface. This allows room within flange 22 for building up a damaged bead with uncured rubber 28 to restore it to the original contour during the retreading process.

As illustrated in FIG. 2, with a vacuum drawn at valve 14 and pressure subsequently applied, the inner and outer curing envelopes 10 and 12 come into intimate, contiguous contact with the entire tread surface and with all exposed surfaces of the casing 18 and cushion gum 20. A positive seal is also established between envelopes 10 and 12 where skirts 12b overlap faces 24a of beads 24. There being no air or other gases or vapor present, a solid bond is achieved when cushion gum 20 vulcanizes. At the same time, any surfaces built-up such as with rubber 28 at the bead 26 are also restored to the original contour.

Figure 5:
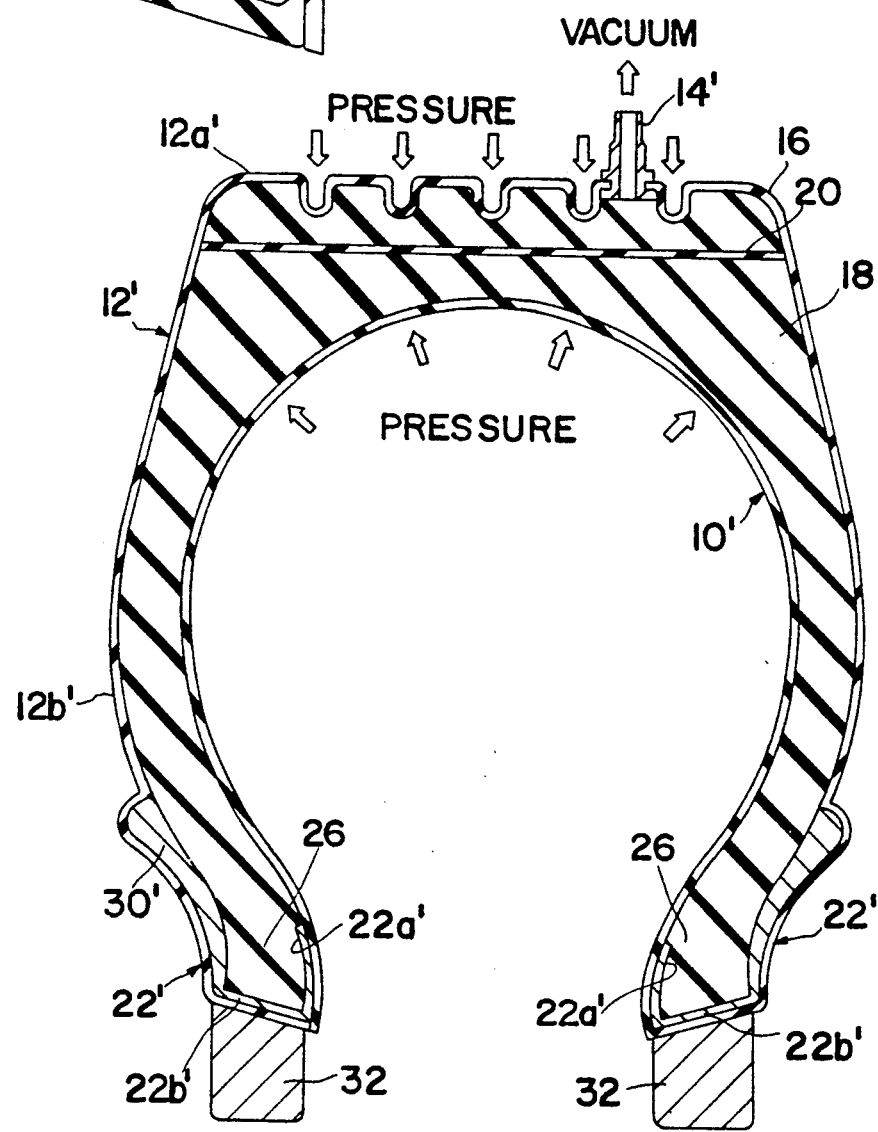
FIG. 5 is a radial cross-sectional view, like FIG. 2, of another embodiment of the inner curing envelope installed with an outer envelope on a tire and under external pressure.

Some tire retreading processes utilize an outer curing envelope which completely covers the entire external surface of the tire, and forms an annular seal where it overlaps an inner curing envelope at the periphery of the tire bead. To accommodate such processes, FIG. 5 shows an alternate embodiment of an inner curing envelope 10', according to the invention, fitted around the inside wall of casing 18. Envelope 10' includes annular flanges 22' of synthetic rubber compression-molded into a generally U-shaped radial cross-section with beads 30 radially extending outwardly from the distal ends of bases 22b' adjacent to beads 26. Sides 22a' radially extending from the proximal ends of bases 22b' are seamed to envelope 10' in the same manner as described in the embodiment of FIG. 4. A positive seal obtains from a pressure transmitted by curing rims 32 through the inner and outer envelopes 10' and 12' to the inside surface of beads 26.

Some of the many advantages and novel features of the invention should now be readily apparent. For example, an inner curing envelope for tire retreading processes is provided composed of only three compression-molded sections sealingly connected at only two seams. This construction enables the use of shorter outer skirts at lower cost to the retreader and, due to its lightweight, installation ease in less time on a tire which has been prepared for retreading. The inner curing envelope also eliminates the need for curing tubes or inflation, protects the tire inner-liner, eliminates tread separation caused by faulty inner liners, improves patch adhesion, and allows consistent heat transfer for uniform cures. The molded configuration of the inner curing envelope, particularly at the tire beads, is useful in the restoration of damage tire beads by enabling these repairs to be completed during the retread curing process. The wedge-shaped edges, compression-molded at the exposed edges of the envelope, provide durability and additional sealing at the overlap with an outer curing envelope.

It will be understood, of course, that various changes in the details, steps and arrangement of parts, which have been herein described and illustrated in order to explain the nature of the invention, may be made by those skilled in the art within the principles and scope of the invention as expressed in the appended claims.

I claim:

1. An inner curing envelope for use in a tire retreading process with an annular elastomeric outer envelope having an inwardly opening U-shaped radial cross-section for encasing a tread secured around the periphery and at least a portion of the side walls of a tire casing having annular beads, comprising:

first molded annular elastomeric means having an inwardly opening U-shaped continuous radial cross-section which in its unstressed state is form fit into a shape complementary to the shape of the inside of the tire casing, said shape having a peripheral portion and a pair of skirt portions integral therewith for contiguously contacting the interior surface of the tire casing; and second seamless compression-molded annular elastomeric means attached to and contiguously extending outwardly from opposite ends of said skirt portions of said first annular means, each of said second annular means having an outwardly opening U-shaped radial cross-section form fit and reinforced adjacent to the tire bead and having an enlarged integral annular sealing rim for underlapping the outer envelope at the outer side walls of the tire casing.

2. An inner curing envelope according to claim 1, wherein:
said enlarged sealing rim is provided on the distal edges of said second annular means and includes a wedge-shaped integral rim tapering outwardly in radial cross-section for sealingly engaging the overlapping outer envelope.

3. An inner curing envelope according to claim 2 wherein:
said rims are disposed on said second annular means for underlapping the outer envelope on opposite outer walls of the tire casing at the widest dimension thereof.

4. An inner curing envelope according to claim 2 wherein:
said rims are disposed on said second annular means for underlapping the outer envelope on opposite outer walls of the tire casing adjacent to the bead of the tire.

5. A curing enclosure for use in tire retreading comprising:
an annular outer elastomeric envelope molded with an inwardly opening U-shaped radial cross-section for encasing an uncured tread secured around the periphery and at least a portion of the side walls of a tire casing; and
an annular inner elastomeric envelope molded with an inwardly opening base portion of U-shaped continuous radial cross-section for contacting the interior surface of the casing of the tire and having opposed outwardly opening seamless compression-molded flange portions of U-shaped radial cross-section attached to and extending outwardly from opposite ends of the base portion and reinforced and molded to form fit and contact the bead of the tire casing and adjacent sidewall surfaces, said flange portions also extending outwardly for engaging a portion of the exterior side walls of the tire casing, said flange portions having enlarged integral sealing rims constructed to engage the outer envelope to form an air-tight seal therewith.

6. A curing enclosure according to claim 5 wherein:
said rims taper outwardly in radial cross-section along the outer edges of said flange portions for sealing the outer envelope thereto.

7. A curing enclosure according to claim 6 wherein:
said flange portions are formed to position said rims on opposite outer walls of the tire casing adjacent to the widest dimension thereof.

8. A curing enclosure according to claim 6 wherein:
said flange portions are formed to position said rims on opposite outer walls of the tire casing adjacent to the bead of the tire.

9. A curing enclosure according to claim 1 wherein:
said second annular means are compression-molded of a gage thicker than said first annular means in the region of said tire bead for maintaining in relief the desired contour of the tire adjacent the beads.

10. A curing enclosure according to claim 5 wherein:
said outwardly opening flange portions are compression-molded of a gage thicker than said base portion for maintaining in relief the desired contour of the tire adjacent the beads.

11. For use in a process for retreading a tire wherein a tread is positioned around the outer periphery of a tire casing having sidewalls terminating in annular beads, and wherein during vulcanization the tread is encased by an outer annular elastomeric curing envelope which overlies the tread and at least portions of the sidewalls of the tire casing; an inner annular elastomeric curing envelope constructed to be placed inside the tire casing for cooperating with the outer curing envelope to form a leak-resistant enclosure about the tire, said inner envelope being form-fit to have in an unstressed condition a shape complementary to the shape of the interior of the tire casing, said shape having an inwardly-opening continuous U-shaped radial cross-section with skirts for extending along the inner sides of the tire casing, said inner envelope also having seamless compression-molded outwardly opening flanges extending reversely alongside the skirts for engaging the outer sides of the tire casing radially outward from its beads, each of said flanges terminating in an enlarged integral annular sealing rim for engaging the inside of the outer curing envelope when both are operatively installed on the tire casing being retreaded, each of said flanges having a base spanning across the tire bead, and, in the one of the bead, being of a form-fit complementary shape and having a greater thickness relative to its associated skirt to provide reinforcement in the region of the bead and to aid in supporting a filler against the bead to enable gouges in the bead to be repaired simultaneously with retreading of the tire, whereby a leak resistant and rugged inner enclosure is provided to facilitate retreading and repair of the tire casing.

12. An inner curing envelope according to claim 11 where said entire inner envelope is formed of compression-molded components.

13. An inner curing envelope according to claim 11 wherein said inner envelope is of tripartite construction and wherein said inner envelope is of seamless molded construction between the flange portions thereof.

14. An inner curing envelope according to claim 11 wherein said sealing rim tapers outwardly to define a wedge-shaped radial cross-section.

15. An inner curing envelope according to claim 14 wherein said wedge-shaped radial cross-section terminates at about the widest dimension of the tire casing.

16. An inner curing envelope according to claim 14 wherein said wedge-shaped radial cross-section terminates adjacent to said beads of the tire casing.

17. For use in a process for retreading a tire wherein a tread is positioned around the outer periphery of a tire casing having sidewalls terminating in annular beads, a tripartite inner annular elastomeric curing envelope constructed to be placed inside the tire casing to prevent leakage from the inside of the casing, said inner envelope having a seamless compression-molded inwardly-opening U-shaped radial cross-section which, in its relaxed state, is complementary to the cross-section of the inside of the tire casing and has skits for contiguously contacting the inside of the tire casing, said inner envelope also having compression-molded seamless outwardly opening flanges extending reversely alongside the skirts for engaging the outer sides of the tire casing radially outward from its beads, each of said flanges terminating in an enlarged integral wedge-shaped annular sealing rim for engaging the outside of the tire sidewalls when operatively installed on the tire casing being retreaded, each of said flanges having a base portion spanning across the tire bead in form fitting relation therewith, and, in the zone of the bead, having a greater thickness relative to its associated skirt to aid in reinforcing the inner envelope in a region of stress and in supporting a filler against the bead to enable gouges in the bead to be repaired simultaneously with retreading of the tire, whereby a leak resistant and rugged inner enclosure is provided to facilitate retreading and repair of the tire casing.

* * * * *

UNITED STATES PATENT AND TRADEMARK OFFICE
CERTIFICATE OF CORRECTION

PATENT NO. : 5,007,978
DATED : April 16, 1991
INVENTOR(S) : Frederick J. Presti

It is certified that error appears in the above-identified patent and that said Letters Patent are hereby corrected as shown below:

Column 6, line 17, "one" should read --zone--;

Column 6, line 49, "skits" should read --skirts--.

Signed and Sealed this

Thirteenth Day of August, 1991

Attest:

HARRY F. MANBECK, JR.

*Attesting Officer*　　　　　　　*Commissioner of Patents and Trademarks*